US007873658B2

(12) United States Patent
Cornpropst et al.

(10) Patent No.: US 7,873,658 B2
(45) Date of Patent: *Jan. 18, 2011

(54) PROPAGATION OF FILTER EXPRESSIONS ACROSS MULTI-LAYERED SYSTEMS

(75) Inventors: Jason Howard Cornpropst, Mebane, NC (US); Kevin Allen Kizer, Apex, NC (US); Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/946,891

(22) Filed: Nov. 29, 2007

(65) Prior Publication Data

US 2008/0077670 A1 Mar. 27, 2008

Related U.S. Application Data

(63) Continuation of application No. 11/159,857, filed on Jun. 23, 2005, now Pat. No. 7,343,368.

(51) Int. Cl.
*G06F 17/30* (2006.01)

(52) U.S. Cl. .................................................. 707/771

(58) Field of Classification Search ............... 707/1–10, 707/771, 769
See application file for complete search history.

(56) References Cited

U.S. PATENT DOCUMENTS

| | | | |
|---|---|---|---|
| 6,226,666 B1 | 5/2001 | Chang et al. | |
| 7,343,368 B2 * | 3/2008 | Cornpropst et al. | 1/1 |
| 2001/0039570 A1 | 11/2001 | Stewart et al. | |
| 2001/0049702 A1 | 12/2001 | Najmi | |
| 2004/0148570 A1 | 7/2004 | Sengodan | |
| 2006/0294056 A1 * | 12/2006 | Cornpropst et al. | 707/2 |
| 2008/0077670 A1 * | 3/2008 | Cornpropst et al. | 709/205 |

\* cited by examiner

*Primary Examiner*—Hosain T Alam
*Assistant Examiner*—Navneet K Ahluwalia
(74) *Attorney, Agent, or Firm*—Jordan IP Law, PC (57) ABSTRACT

A method in a data processing system for propagation of filter expressions across multi-layered systems. If a selection criteria expression in a data request received by a first data processing engine from an application is incompatible with selection criteria expressions of a second data processing engine, the data request and the portion of the selection criteria expression that is compatible with selection criteria expressions of the second data processing engine is transmitted to the second data processing engine. If the second data processing engine received a message that matches the compatible portion of the selection criteria expression, the message that matches is transmitted to the first data processing engine. If the message that matches the compatible portion also matches the portion of the selection criteria expression that is incompatible with the selection criteria expressions of the second data processing engine, the message that matches is transmitted to the application.

12 Claims, 11 Drawing Sheets

| XPath Function | JMS Function |
|---|---|
| count() | n/a |
| id() | n/a |
| last() | n/a |
| local-name() | n/a |
| name() | n/a |
| namespace-uri() | n/a |
| position() | n/a |
| concat() | n/a |
| contains() | LIKE |
| normalize-space() | n/a |
| starts-with() | LIKE |
| string() | n/a |
| string-length() | n/a |
| substring() | LIKE |
| substring-after() | LIKE |
| substring-before() | LIKE |
| translate() | n/a |
| ceiling() | n/a |
| floor() | n/a |
| number() | n/a |
| round() | n/a |
| sum() | + |
| boolean() | n/a |
| false() | FALSE |
| lang() | n/a |
| not() | NOT |
| true() | TRUE |

```
Tree createJmsTree(Tree inputTree) {
        // if one of the sides of an "AND" cannot be mapped to a JMS selector
        // we have to assume it will evaluate as TRUE. Since TRUE AND anything
        // is always equals to "anything", we should only pass the other side
        // of the expression to JMS.
        if (inputTree.op == "and") {
              Tree leftTree == createJmsTree (inputTree.left);
              Tree rightTree == createJmsTree (inputTree.right);

if (leftTree == Tree.unknownToJms) return rightTree;
              if (rightTree == Tree.unknownToJms) return leftTree;

return new Tree("AND", leftTree, rightTree);
        }

// if one of the sides an "OR" cannot be mapped to JMS selector
        // we have to assume it will evaluate as TRUE. Since TRUE OR anything
        // is always equals to TRUE, we should assume that the entire expression
        // should not be passed to JMS.
        if (inputTree.op = "or") {
              Tree leftTree == createJmsTree(inputTree.left);
              if (leftTree == Tree.unknownToJms) return Tree.unknownToJms;

Tree rightTree == createJmsTree(inputTree.right);
              if (rightTree == Tree.unknownToJms) return Tree.unknownToJms;

return new Tree("OR", leftTree, rightTree);
        }

// if one of the sides of a binary operation (equals, less than, greater
        // than, etc) is unknown to JMS, nothing should be passed to JMS.
        if (isBinaryOperand(inputTree.op)) {
              if (isUnknownToJms(inputTree.op)) return Tree.unknownToJms;
              if (isUnknownToJms(inputTree.leftOperand)) return Tree.unknownToJms;
              if (isUnknownToJms(inputTree.rightOperand)) return Tree.unknownToJms;
              return inputTree;
        }

// if the operand of an unary operation (ceiling, boolean, etc)
        // is unknown to JMS, nothing should be passed to JMS.
        if (isUnaryOperand(inputTree.op)) {
              if (isUnknownToJms(inputTree.op)) return Tree.unknownToJms;
              if (isUnknownToJms(inputTree.operand)) return Tree.unknownToJms;
              return inputTree;
        }

// if none of the foreseen portions of XPath was caught before, it means
        // this algorithm does not understand it. If it doesn't, one should assume
        // it cannot be mapped to JMS.
        return Tree.unknownToJms;
}
```

FIG. 9

```
Tree createXPathTree(Tree inputTree) {
        // if one of the sides of an "AND" can be mapped to a JMS selector
        // we know it will have been evaluated by the JMS layer, therefore
        // we can assume it is TRUE. Since TRUE AND anything is always equals to
        // "anything", we should only process the other side of the expression
        // in the XPath layer.
        if (inputTree.op = "and") {
              Tree leftTree = createXPathTree (inputTree.left);
              Tree rightTree = createXPathTree (inputTree.right);

if (leftTree = Tree.knownToJms) return rightTree;
              if (rightTree = Tree.knownToJms) return leftTree;

return new Tree("AND", leftTree, rightTree);
        }

// if one of the sides an "OR" can be mapped to a JMS selector
        // we know it will have been evaluated by the JMS layer, therefore
        // we can assume it is TRUE. Since TRUE OR anything is always equals to TRUE
        // we should assume that the entire expression should not be processed
        // in the XPath layer.
        if (inputTree.op = "or") {
              Tree leftTree = createXPathTree(inputTree.left);
              if (leftTree = Tree.knownToJms) return Tree.knownToJms;

Tree rightTree = createXPathTree (inputTree.right);
              if (rightTree = Tree.knownToJms) return Tree.knownToJms return new Tree("OR", leftTree, rightTree);
        }

// if both sides of a binary operation (equals, less than, greater
        // than, etc) are known to JMS, nothing should be passed to the XPath layer.
        if (isBinaryOperand(inputTree.op)) {
              if (isKnownToJms(inputTree.op) and
                  isKnownToJms(inputTree.leftOperand) and
                  isKnownToJms(inputTree.rightOperand)) return Tree.knownToJms;
              return inputTree;
        }

// if the operand of an unary operation (ceiling, boolean, etc) is known
        // to JMS, nothing should be passed to the XPath layer.
        if (isUnaryOperand(inputTree.op)) {
              if (isKnownToJms(inputTree.op) and
                  isKnownToJms(inputTree.operand)) return Tree.knownToJms;
              return inputTree;
        }

// if none of the previous conditions was applicable, it means it
        // wasn't addressed by the algorithm and the best is to assume it
        // was not passed to the JMS layer. Therefore it should it still
        // be preserved.
        return inputTree;
}
```

FIG. 10A

```
void splittingAlgorithm(String inputXpathSelector) {
        Tree inputTree = parseXPath(inputXpathSelector);

Tree jmsTree = createJmsTree(inputTree);
        String jmsSelector = buildJmsSelector(jmsTree);

Tree xPathTree = createXPathTree(inputTree);
        String xpathSelector = buildJmsSelector(jmsTree);

... subscribe to JMS passing jmsSelector ...

Message jmsMessage = receiveJmsMessage();

String xmlMessage = convertJmsMessage(msg);

if (xpathMatch(xmlMessage, xpathSelector) == true) then process(xmlMessage);
}
```

PROPAGATION OF FILTER EXPRESSIONS ACROSS MULTI-LAYERED SYSTEMS

This application is a continuation of application Ser. No. 11/159,857, filed Jun. 23, 2005, now U.S. Pat. No. 7,343,368 status allowed.

BACKGROUND OF THE INVENTION

1. Field of the Invention

The present invention relates generally to an improved data processing system, in particular, to a method, system, and computer program product for optimizing performance in a data processing system. Still more particularly, the present invention provides a method, system, and computer program product for propagation of filter expressions across multi-layered systems.

2. Description of the Related Art

Message (event) brokers are common middleware for large computer installations. Middleware is software that mediates between an application program and a network, managing the interaction between disparate applications across the heterogeneous computing systems or platforms. These systems or platforms may be arranged in multiple layers, with an underlying system and multiple systems overlaying one another.

Message brokers implement asynchronous notification delivery in several formats. Asynchronous notification requires that a client application register itself with a message broker and request that the message broker notify the client application whenever the message broker receives information from a system that matches the selection criteria, or filter expression, specified by the client application.

Application Program Interfaces (APIS) are used in order to achieve a certain degree of interoperability between applications and message brokers, and between differing message brokers. These APIs include such standards as Java™ Message Service (JMS), Web Service Notification (WS-Notification), Structured Query Language (SQL), and Java™ Data Base Connectivity (JDBC). APIs and message brokers both serve as data processing engines.

Because JMS is part of the Java™ 2 platform Enterprise Edition (J2EE) specification, there are already several message brokers that support this API. WS-Notification is a more generic API that is also being adopted in mainstream J2EE application servers because WS-Notification allows applications to interoperate with message brokers that are not based in the J2EE technology.

This invention solves a problem that arises when overlaying a message broker with an API that has selection criteria that is partially or completely incompatible with the message broker. For example of partial incompatibility, overlaying a JMS implemented API with a WS-Notification message broker creates a problem due to selection criteria that is partially incompatible. For an example of complete incompatibility, the filtering of binary data in a relational database management system is inefficient because no filtering is performed in the underlying data processing engine.

Overlaying an implementation of an API with a partially incompatible notification message broker is relatively inexpensive when compared to writing a notification message broker from scratch. However, a problem may arise from differences between the selection criteria for an API and the selection criteria for a notification message broker. For example, WS-Notification message broker uses an XPath notation, and the selection criteria in the XPath notation differs from the selection criteria used in a JMS implemented API. Sometimes these differences between the selection criteria for an API and the selection criteria for a notification message broker may be too difficult to work around. For example, the XPath users may apply a "ceiling" operation on float values before a comparison, but there is no counterpart in the JMS implemented API selection criteria language. In another example, any type of hierarchical or positional filter may be difficult to implement in a relational model, such as a relational database management system.

Due to such difficulties, some implementations of notification message brokers overlaid on certain APIs will choose not to propagate selection criteria to the underlying message broker. For example, implementations of WS-Notification message brokers overlaid on JMS implemented APIs will choose not to propagate JMS selection criteria to the underlying message broker. Because of the lack of applied selection criteria, the WS-Notification message broker accepts and converts all possible incoming messages from the underlying message broker to its XML representation and then applies the selection criteria in the XPath expression to all of the converted XML messages. This is generally more expensive than attempting to filter the incoming messages at the underlying message broker, which would prevent much unnecessary transmission between the two brokers and the conversion of unneeded data to XML representation.

Incompatibilities between some notification message brokers and with certain APIs create problems that include data types, repeating elements, expressions against element names, and node level operations. For example, JMS supports only the following data types: Boolean, byte, short, int, long, float, double, and string. Additionally, because relational databases do not have the concept of arrays, some vendors have added non-standard array support. Therefore, a notification message broker that uses selection criteria with data types outside JMS' limited range cannot use these additional data types for anything other than string comparing functions. For example, XPath uses datetime, which is not supported by JMS.

Because some APIs only filter message headers, all data for filtering is simply stored as properties. Therefore, the name of each property must be unique because it is not possible to have a repeating element represented in the message header. One example of an API that only filters message headers is JMS.

Because some APIs do not support any expressions against the attribute name, no wildcards or similar expressions can be used. For example, "/MyData[*='avalue']" cannot be used for some APIs because the wildcard '*' expression is not supported.

Node level operations, such as trying to pick the third occurrence of an element, cannot be done in some APIS. For example, "/MyData[last( ) and A=32]" cannot be done in some APIs because of the attempt to select the last occurrence of an element.

Therefore, it would be advantageous to have a method, system, and computer program product for propagation of filter expressions across multi-layered systems.

BRIEF SUMMARY OF THE INVENTION

The present invention is a method, system, and computer program product in a data processing system for propagation of filter expressions across multi-layered systems. If a selection criteria expression in a data request received by a first data processing engine from an application is incompatible with selection criteria expressions of a second data processing engine, the data request and the portion of the selection criteria expression that is compatible with selection criteria expressions of the second data processing engine is transmitted to the second data processing engine. If the second data processing engine received a message that matches the compatible portion of the selection criteria expression, the message that matches is transmitted to the first data processing engine. If the message that matches the compatible portion also matches the portion of the selection criteria expression that is incompatible with the selection criteria expressions of the second data processing engine, the message that matches is transmitted to the application.

BRIEF DESCRIPTION OF THE SEVERAL VIEWS OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 9 is an example of a splitting algorithm used for compatible selection criteria, in accordance with an illustrative embodiment of the present invention;

DETAILED DESCRIPTION OF THE INVENTION

Figure 1:
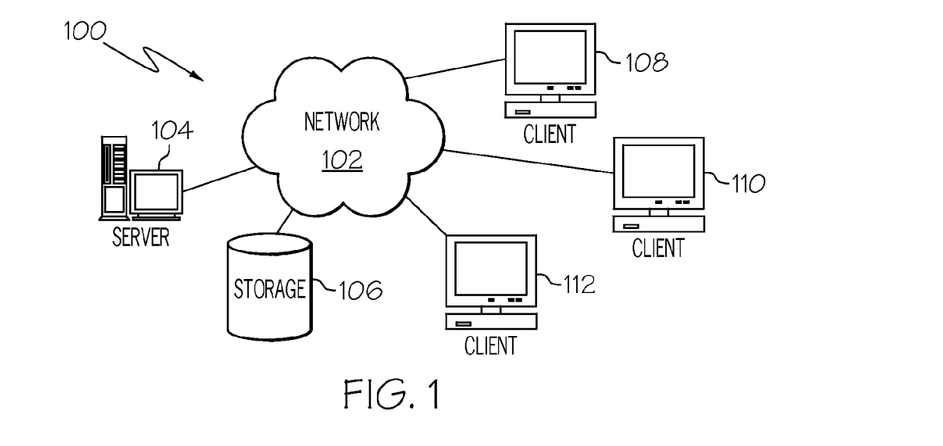
FIG. 1 is a pictorial representation of a data processing system in which the present invention may be implemented, according to an illustrative embodiment of the present invention.
Figure 2:
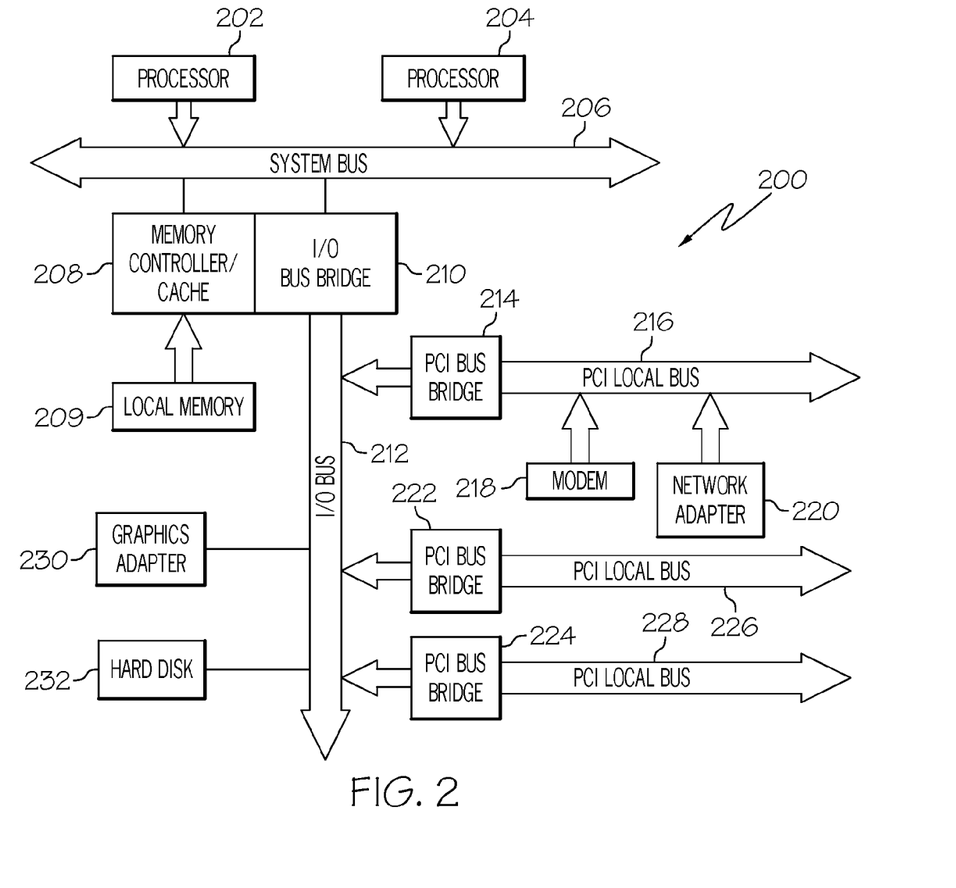
FIG. 2 is a block diagram of a data processing system that may be implemented as a server in which the present invention may be implemented, according to an illustrative embodiment of the present invention.
Figure 3:
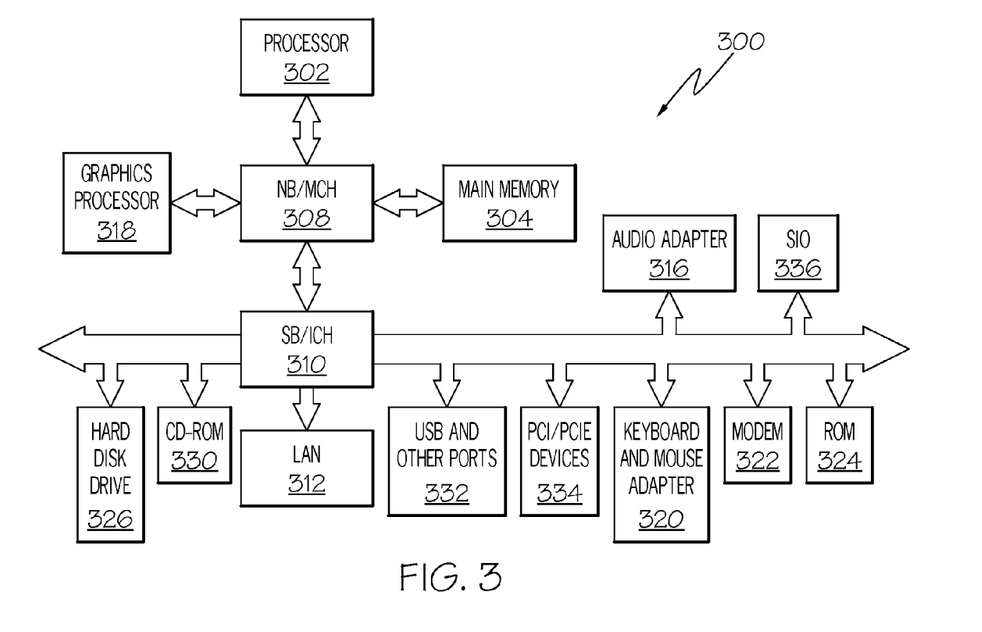
FIG. 3 is a block diagram illustrating a data processing system in which the present invention may be implemented, according to an illustrative embodiment of the present invention.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, a running the Advanced Interactive Executive (AIX®) operating system, or a LINUX operating system (eServer, pSeries and AIX are trademarks of International Business Machines Corporation in the United States, other countries, or both while LINUX is a trademark of Linus Torvalds in the United States, other countries, or both). With reference now to FIG. 3, a block diagram of a data processing system is shown in which aspects of the present invention may be implemented. Data processing system 300 is an example of a computer, such as client 108 in FIG. 1, in which codes or instructions implementing the processes for embodiments of the present invention may be located. In the depicted example, data processing system 300 employs a hub architecture including a north bridge and memory controller hub (NB/MCH) 308 and a south bridge and input/output (I/O) controller hub (SB/ICH) 310. Processor 302, main memory 304, and graphics processor 318 are connected to NB/MCH 308. Graphics processor 318 may be connected to the NB/MCH 308 through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to SB/ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). HDD 326 and CD-ROM drive 330 may use, for example, an integrated drive electronics (IDE) or serial advanced technology attachment (SATA) interfaces. A super I/O (SIO) device 336 may be connected to SB/ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as HDD 326, and may be loaded into main memory 304 for execution by processor 302. The processes for embodiments of the present invention are performed by processor 302 using computer implemented instructions, which may be located in a memory such as, for example, main memory 304, ROM 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course, the bus system may be implemented using any type of communications fabric or architectures that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

This invention may be applied to any system architecture where data processing engines are chained to provide data transformation from the format where the data is stored to the format expected by the users of the data, thus allowing filtering capabilities to be supported that are not provided in the underlying data processing engine. Because many of these data processing engines offer selector expressions to filter data content, the goal of this invention is to allow the original selector expression provided by the user to be split into portions that can be assigned to individual processing engines in order to minimize data transformation and transmission.

Figure 4:
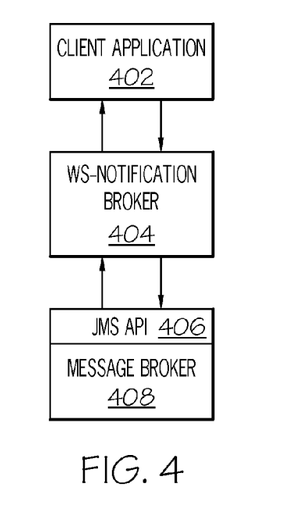
FIG. 4 is a block diagram illustrating examples of components used for propagation of filter expressions across multi-layered systems.

FIG. 4 is a block diagram illustrating examples of components used for propagation of filter expressions across multi-layered systems. The example in FIG. 4 is one of many examples where an architecture relying on multiple data processing engines would benefit from an embodiment of the present invention. Client Application 402 uses WS-Notification Broker 404 as its message broker. WS-Notification Broker 404 is overlaid on JMS Application Program Interface (API) 406. In turn, JMS (API) 406 is overlaid on underlying Message Broker 408.

Figure 5:
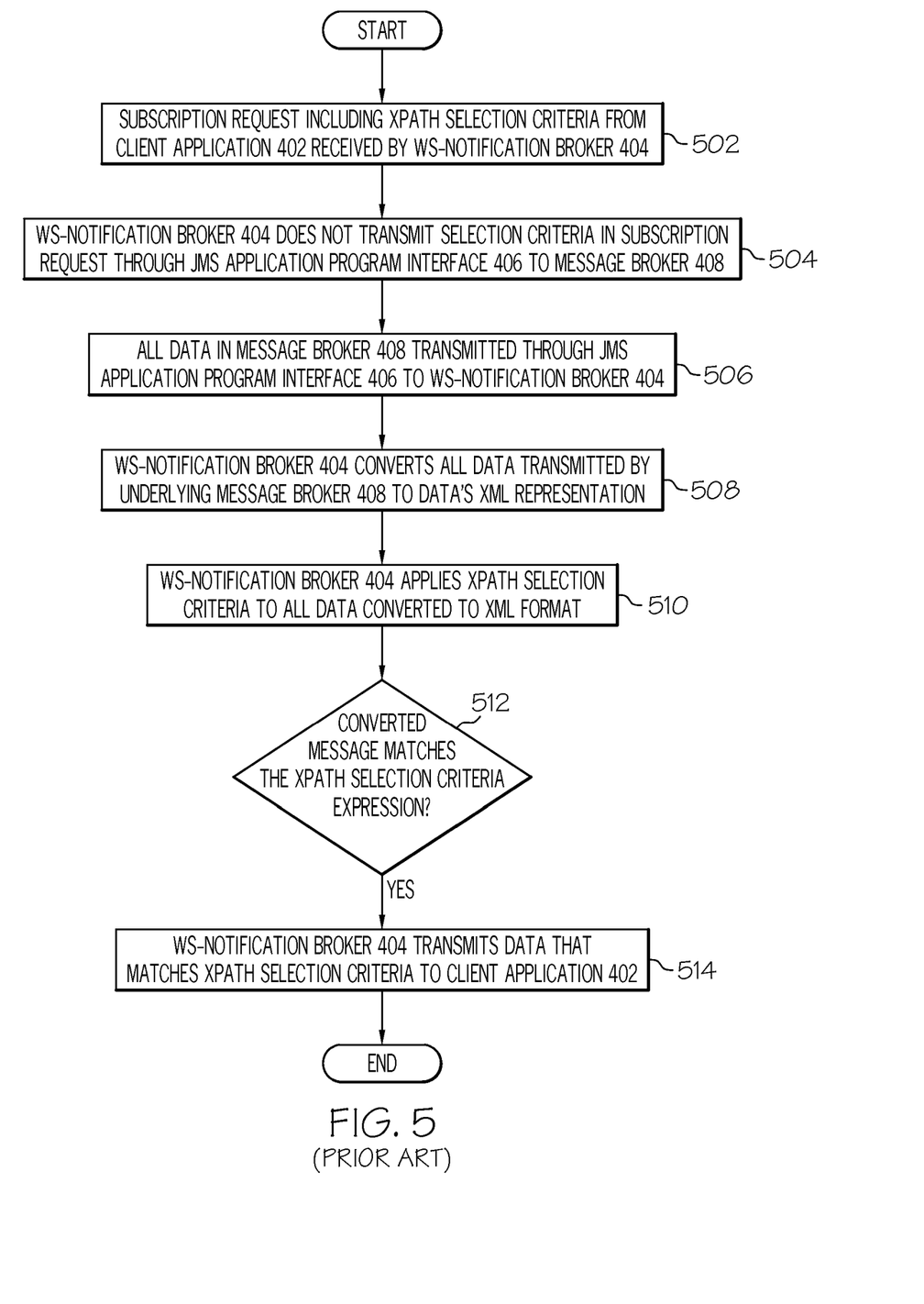
FIG. 5 is a flowchart illustrating a known process used for propagation of filter expressions across multi-layered systems.

Referencing FIG. 4 components, FIG. 5 is a flowchart illustrating a known process used for propagation of filter expressions across multi-layered systems. A subscription request that includes an XPath selection criteria expression originates from a user using Client Application 402 and is received by WS-Notification Broker 404 (step 502). WS-Notification Broker 404 does not transmit the selection criteria expression in the subscription request through JMS API 406 to underlying Message Broker 408 (step 504) because the set of selection criteria expressions in JMS API 406 are incompatible with the XPath selection criteria expression that the user specified in Client Application 402. The set of selection criteria expressions in JMS API 406 comprises at least one selection criteria expression. All of the data in underlying Message Broker 408 is transmitted through JMS API 406 to WS-Notification Broker 404 (step 506) because underlying Message Broker 408 did not have the XPath selection criteria expression to filter any of the data. WS-Notification Broker 404 converts all of the data received by and subsequently transmitted by underlying Message Broker 408 to the data's XML representation (step 508). WS-Notification Broker 404 applies the XPath selection criteria expression to all of the data converted to XML format (step 510). If the converted message matches the XPath selection criteria expression (step 512), WS-Notification Broker 404 transmits the data that matches the XPath selection criteria expression to Client Application 402 (step 514).

Figure 6:
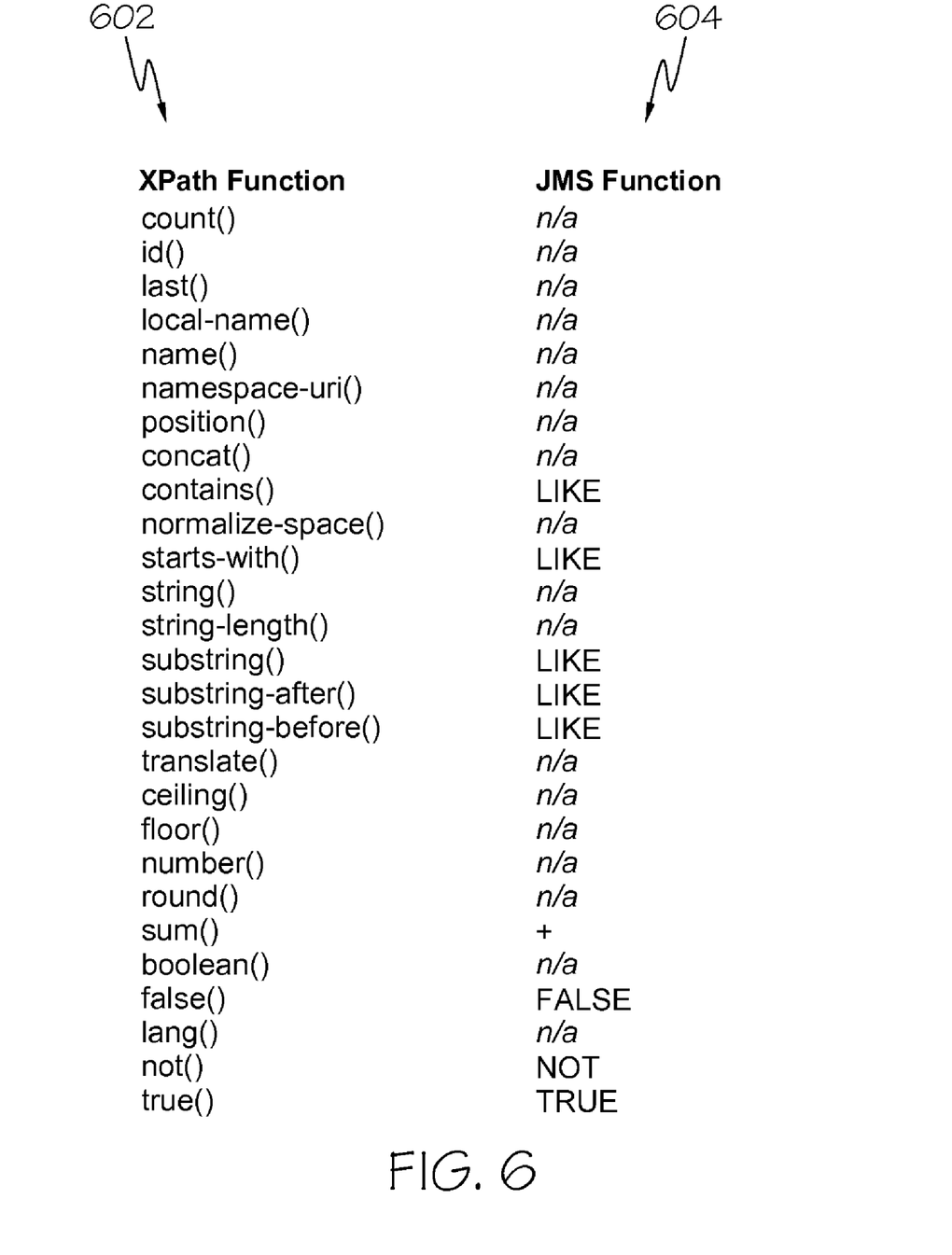
FIG. 6 lists examples of XPath functions, and compares these functions to possible corresponding JMS functions.

FIG. 6 lists examples of an XPath function 602, and compares these functions to possible corresponding functions listed under a JMS function 604. If a function under JMS function 604 corresponding to a function listed under XPath Function 602 lists "n/a," then there is no available JMS function to correspond to the XPath function. As can be seen in FIG. 5, for most of the examples listed in the XPath Function 602 there is no available corresponding function listed under JMS Function 604. For the few JMS functions that correspond to XPath functions, JMS Function 604 lists the corresponding JMS function.

In order to solve this incompatibility problem, embodiments of the present invention split the original selection criteria expression into two portions. The first portion is the portion of the original selection criteria expression that is compatible with an expression in the underlying API's set of selection criteria expressions. The set of selection criteria expressions in the underlying API comprises at least one selection criteria expression. The second portion is the portion of the original selection criteria expression that is incompatible with an expression in the underlying API's set of selection criteria expressions. For example, not all XPath selection criteria expressions are compatible with the set of JMS selection criteria expressions, such that the present invention splits the original XPath selection criteria expression into a portion that is compatible with an expression in the underlying set of JMS selection criteria expressions, and a portion of the XPath selection criteria expression that is incompatible with an expression in the underlying set of JMS selection criteria expressions.

Upon receiving a subscription request, embodiments of the present invention transmit the compatible portion of the selection criteria expression with the subscription request through the API to the underlying message broker. Whenever a message is received the message broker matches the selection criteria specified by the compatible portion of the selection criteria expression, the message broker transmits the message received through the API to the notification message broker, which then converts the message received to its own representation format so that the notification message broker can apply the portion of the selection criteria expression that was incompatible with the API's set of selection criteria expressions. If the converted message matches the portion of the selection criteria expression that was incompatible with the API's set of selection criteria expressions, the notification message broker transmits the converted message to the client application.

Figure 7:
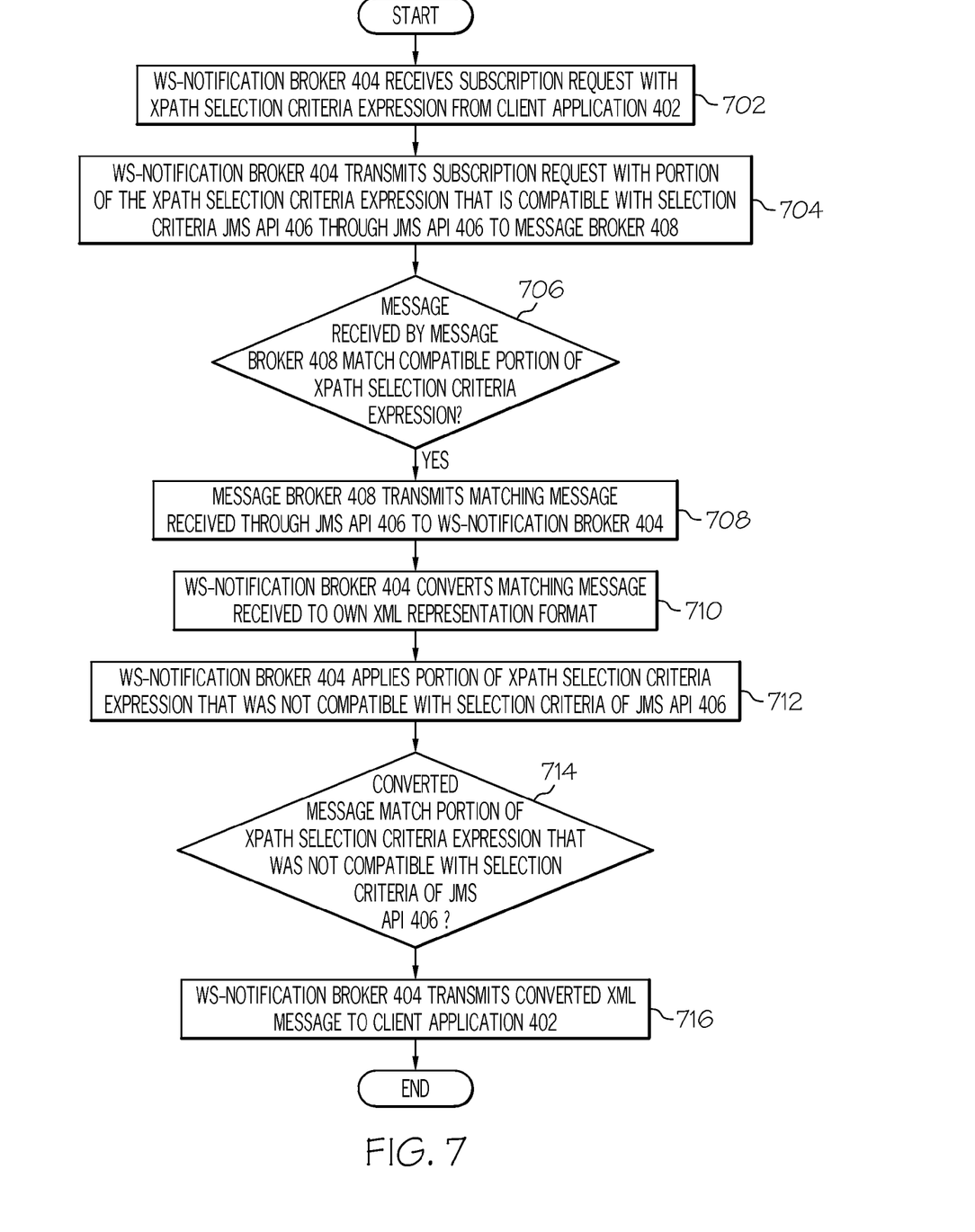
FIG. 7 illustrates an example of a process that occurs when not all selection criteria of a data processing engine are compatible with the selection criteria of another data processing engine, according to an illustrative embodiment of the present invention.

Referencing FIG. 4 components, FIG. 7 illustrates an example of a process that occurs when not all selection criteria of a data processing engine is compatible with the set of selection criteria of another data processing engine, according to an illustrative embodiment of the present invention. Upon receiving a subscription request with an XPath selection criteria expression from Client Application 402 (step 702), WS-Notification Broker 404 transmits the subscription request with the portion of the XPath selection criteria expression that is compatible with the set of selection criteria expressions of JMS API 406 through JMS API 406 to the underlying Message Broker 408 (step 704). Whenever a message received by Message Broker 408 matches the compatible portion of the selection criteria expression specified by the XPath subscription request (step 706), Message Broker 408 transmits the message received through JMS API 406 to WS-Notification Broker 404 (step 708). Then WS-Notification Broker 404 converts the message received to its own XML representation format (step 710) so that WS-Notification Broker 404 can apply the portion of the XPath selection criteria expression that was incompatible with the set of selection criteria expressions of JMS API 406 (step 712). If the converted message matches the portion of the XPath selection criteria expression that was incompatible with the set of selection criteria expressions of JMS API 406 (step 714), WS-Notification Broker 404 transmits the converted XML message to Client Application 402 (step 716).

Using this arrangement, embodiments of the present invention greatly minimize the transmission and conversion of messages because the underlying message broker has more filtering information, information about what messages should be transmitted to the API overlaying the underlying message broker and what messages should not be transmitted to the API overlaying the underlying message broker.

Figure 8:
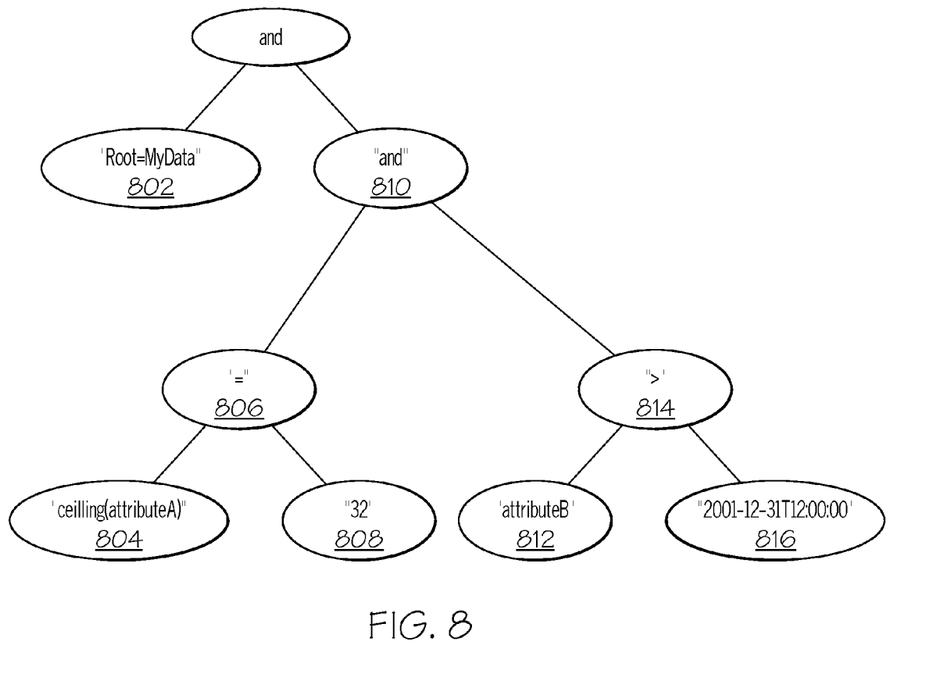
FIG. 8 illustrates a tree-like representation of a selection criteria expression, in accordance with an illustrative embodiment of the present invention.

FIG. 8 illustrates a tree-like representation of a selection criteria expression, in accordance with an illustrative embodiment of the present invention. A tree-like representation is generated by a parser, or a splitting algorithm, that uses tree branches to represent portions of an expression. For example, a tree-like representation is generated by an XPath parser such as JXPath (available for free on-line from Apache Commons) which uses tree branches to represent portions of an expression. In this example, "/MyData[ceiling[@attributeA]=32 and @attributeB>'2001-12-31T12:00:00']" is represented as parsed into a tree with "Root=MyData" 802, "ceiling[attributeA]" 804, "=" 806, "32" 808, "and" 810, "attributeB" 812, ">" 814, and "'2001-12-31T12:00:00'" 816.

A splitting algorithm in accordance with an embodiment of the present invention parses selection criteria expressions to create a pair of tree-like representations, where the first tree may be used to rebuild the compatible portion of the selection criteria expression and the second tree can be used to rebuild the incompatible portion of the selection criteria expression. The splitting algorithm is recursive in nature.

FIG. 9 is an example of a splitting algorithm used for compatible selection criteria, in accordance with an illustrative embodiment of the present invention.

Figure 10B:
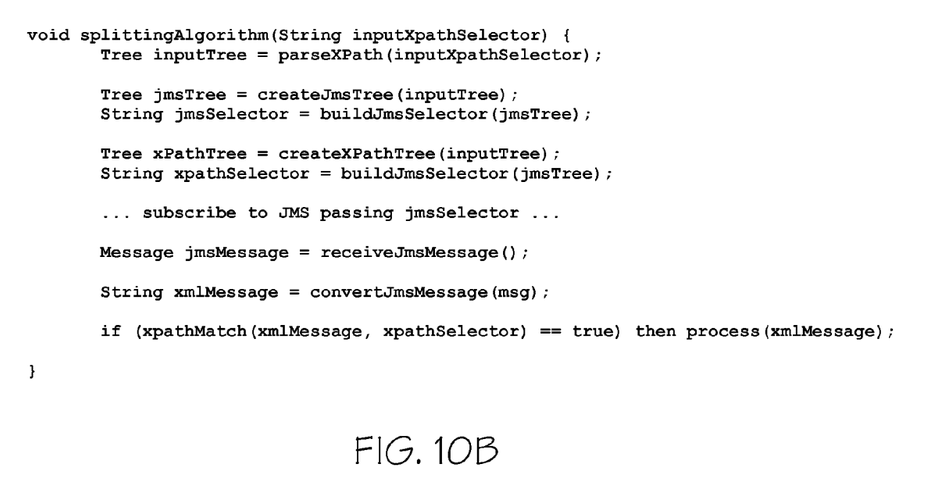
FIG. 10 is an example of a splitting algorithm used for incompatible selection criteria, in accordance with an illustrative embodiment of the present invention.

FIG. 10 is an example of a splitting algorithm used for incompatible selection criteria, in accordance with an illustrative embodiment of the present invention.

Figure 11:
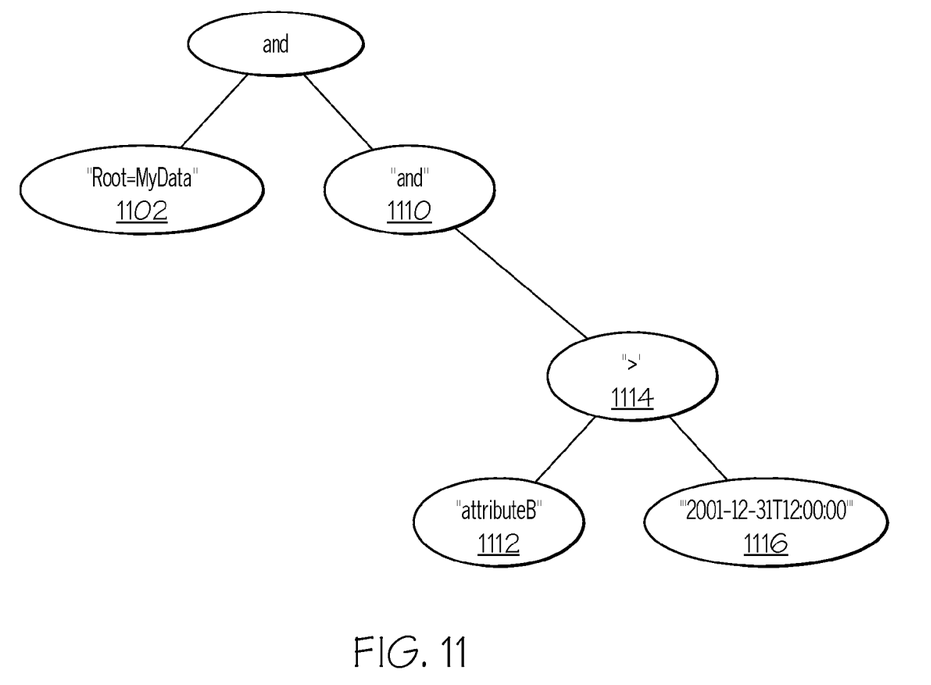
FIG. 11 is an example of an output for a splitting algorithm used for compatible selection criteria, in accordance with an illustrative embodiment of the present invention.

FIG. 11 is an example of an output for a splitting algorithm used for compatible selection criteria, in accordance with an illustrative embodiment of the present invention. In this illustrative embodiment, the createJmsTree algorithm parses "/MyData[ceiling[@attributeA]=32 and @attributeB>'2001-12-31T12:00:00']" into a tree as "Root=MyData" 1102, "and" 1110, "attributeB" 1112, ">" 1114, and "'2001-12-31T12:00:00'" 1116.

Figure 12:
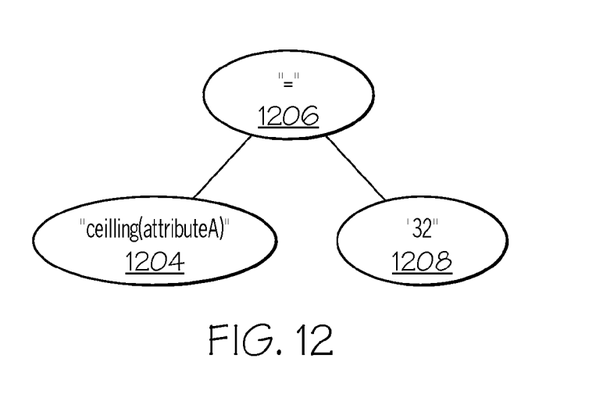
FIG. 12 is an example of an output for a splitting algorithm used for incompatible selection criteria, in accordance with an illustrative embodiment of the present invention.

FIG. 12 is an example of an output for a splitting algorithm used for incompatible selection criteria, in accordance with an illustrative embodiment of the present invention. In this illustrative embodiment, the createXPathTree algorithm parses "/MyData[ceiling[@attributeA]=32 and @attributeB>'2001-12-31T12:00:00']" into a tree as "ceiling[attributeA]" 1204, "=" 1206, and "32" 1208.

When these trees are reconstructed, the following expression is reached, which is passed on to the JMS and XPath layers:

JMS: "Root=MyData AND attributeB>'2001-12-31T12:00:00'"

XPath: "MyData[ceiling(attributeA)=32]"

Upon filtering, the JMS layer lets all the data of type "MyData" and attributed>'2001-12-31T12:00:00' pass through to the XPath layer. In the XPath layer, only the data coming from the JMS layer where the function "ceiling" applied to attributeA is equal to 32 will pass through to the client application.

The net result is that the end-user using the client application that subscribed to the message broker will only receive data where the combination of both filters allowed the data to pass.

The present invention applies to any type of data processing engines, not only WS-Notification brokers and JMS providers. Such an application only requires taking into account the type of selector expressions supported by each data processing engine and adjusting the algorithm to the syntax used by each layer.

Figure 13:
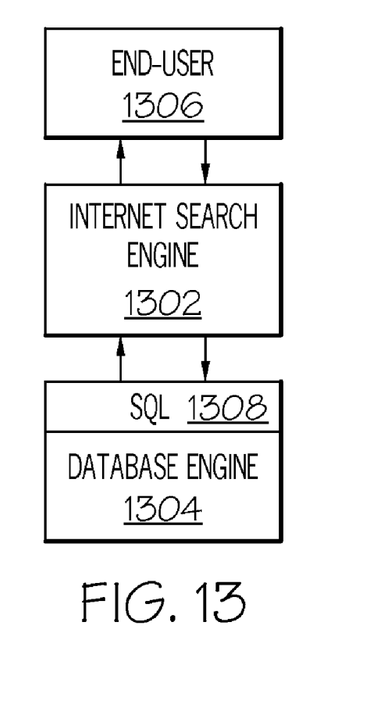
FIG. 13 illustrates an example of an Internet search engine paired with a database engine, according to an embodiment of the present invention.

For example, FIG. 13 illustrates an example of Internet Search Engine 1302 paired with Database Engine 1304, according to an embodiment of the present invention. In this illustrative embodiment, Internet Search Engine 1302 allows End-user 1306 to provide search criteria in a different language other than Structured Query Language (SQL) 1308, the search language used in mainstream database engines. The language used by End-user 1306 may support primitives not supported by SQL 1308. An algorithm in accordance with an embodiment of the present invention may split the original search criteria in the portion that is understood by Database Engine 1304 and the portion understood by the Internet Search Engine 1302.

Figure 14:
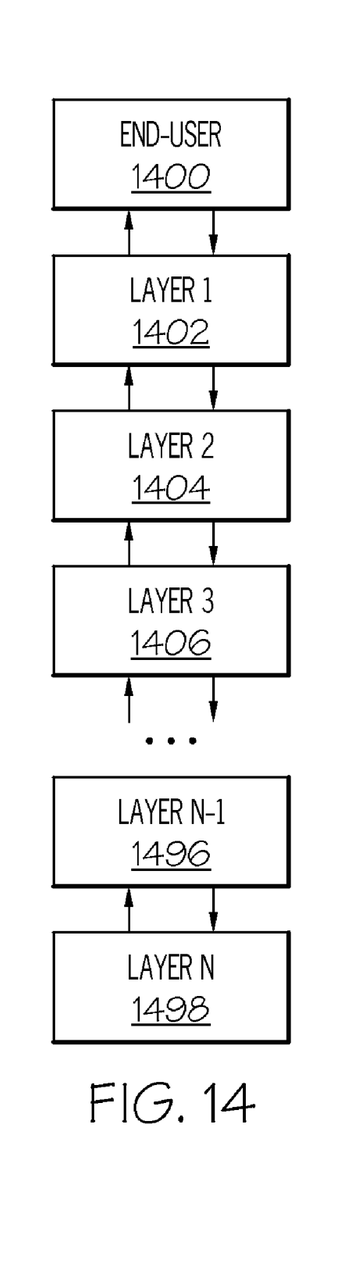
FIG. 14 illustrates an example of architecture with more than two data processing engines, according to an embodiment of the present invention.

FIG. 14 illustrates an example of architecture with more than two data processing engines, according to an embodiment of the present invention. In this illustrative embodiment, once the algorithm splits a selection criteria expression between the first and second layer, the algorithm splits the selection criteria expression assigned to the second layer between the second and third layers. For example, the algorithm splits an original selection criteria expression specified by End-user 1400 into two portions, a portion of the original selection criteria expression supported by Layer 2 1404, and a portion of the original selection criteria expression supported by Layer 1 1402 only. The portion of the original selection criteria expression supported by Layer 2 1404 is passed to Layer 2 1404 and the portion of the original selection criteria expression supported by Layer 1 1402 is assigned to Layer 1 1402. Next, the algorithm splits the selection criteria expression passed to Layer 2 1404 into two portions, a portion of the selection criteria expression supported by Layer 3 1406, and a portion of the selection criteria expression supported by Layer 2 1404 only. The portion of the selection criteria expression supported by Layer 3 1406 is passed to Layer 3 1406 and the portion of the selection criteria expression supported by Layer 2 1404 is assigned to Layer 2 1404. This process continues down to the last layers, Layer N-1 1496 and Layer N 1498. Finally, the algorithm splits the selection criteria expression passed to Layer N-1 1496 into two portions, a portion of the selection criteria expression supported by Layer N 1498, and a portion of the selection criteria expression supported by Layer N-1 1496 only. The portion of the selection criteria expression supported by Layer N 1498 is passed to Layer N 1498 and the portion of the selection criteria expression supported by Layer 1496 N-1 is assigned to Layer N-1 1496.

Whenever a message received by Layer N 1498 matches the compatible portion of the selection criteria expression specified by the subscription request, Layer N 1498 transmits the matching message received to Layer N-1 1496. Then Layer N-1 1496 converts the matching message received to its own representation format so that Layer N-1 1496 can apply the portion of the selection criteria expression that was incompatible with the set of selection criteria expressions of Layer N 1498. If the converted message matches the portion of the selection criteria expression that was incompatible with set of the selection criteria expressions of Layer N 1498, Layer N-1 1496 delivers the converted message to the next layer. This process repeats similarly at higher layers, such that a message may propagate up to End-user 1400 if it matches all of the selection criteria expression.

Altogether, the components and process as shown in FIG. 7 provides an improved method for propagation of filter expressions across multi-layered systems.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor, a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for propagation of filter expressions across multi-layered systems, comprising:
    a bus;
    a storage device connected to the bus, wherein the storage device contains computer usable code;
    a communications unit connected to the bus; and
    a processing unit connected to the bus, wherein the processing unit executes the computer usable code to receive, at a first data processing engine, a data request from an application:
transmit the data request with a portion of a specified selection criteria expression that is compatible with a set of selection criteria expressions of a second data processing engine to the second data processing engine, wherein the second data processing engine determines whether a message received at the second data processing engine matches the portion of the specified selection criteria expression that is compatible with the set of selection criteria expressions of the second data processing engine, and, if the message received at the second data processing engine matches the portion of the specified selection criteria expression that is compatible with the set of selection criteria expressions of the second data processing engine, transmits the message to the first data processing engine;
    determine whether the message matches a portion of the specified selection criteria expression that is incompatible with the set of selection criteria expressions of the second data processing engine; and
if the message matches a portion of the specified selection criteria expression that is incompatible with the set of selection criteria expressions of the second data processing engine, transmit the message to the application.

2. The data processing system of claim 1 wherein at least one of the first data processing engine and the second data processing engine is a message broker.

3. The data processing system of claim 2 wherein the message broker is a Web Service Notification broker.

4. The data processing system of claim 2 wherein the message broker uses one of XPath notation and structured query language.

5. The data processing system of claim 1 wherein at least one of the first data processing engine and the second data processing engine is an application program interface.

6. The data processing system of claim 1 further comprising:
    creates a tree to represent the portion of the selection criteria expression that is compatible with the set of selection criteria expressions of the second data processing engine using a splitting algorithm.

7. The data processing system of claim 1 further comprising:
    creates a tree to represent the portion of the selection criteria expression that is incompatible with the set of selection criteria expressions of the second data processing engine using a splitting algorithm.

8. The data processing system of claim 1 further comprising:
    more than two data processing engines.

9. A computer program product for resolving propagation of filter expressions across multi-layered systems, the computer program product comprising:
    a computer usable storage medium having computer usable program code embodied therein;
    computer usable program code configured to receive, at a first data processing engine, a data request from an application;
    computer usable program code configured to transmit the data request with a portion of a specified selection criteria expression that is compatible with a set of selection criteria expressions of a second data processing engine to the second data processing engine, wherein the second data processing engine determines whether a message received at the second data processing engine matches the portion of the specified selection criteria expression that is compatible with the set of selection criteria expressions of the second data processing engine, and, if the message received at the second data processing engine matches the portion of the specified selection criteria expression that is compatible with the set of selection criteria expressions of the second data processing engine, transmits the message to the first data processing engine;
    computer usable program code configured to determine whether the message matches a portion of the specified selection criteria expression that is incompatible with the set of selection criteria expressions of the second data processing engine; and
    computer usable program code configured to transmit the message to the application, if the message matches a portion of the specified selection criteria expression that is incompatible with the set of selection criteria expressions of the second data processing engine.

10. The computer program product of claim 9 wherein at least one of the first data processing engine and the second data processing engine is a message broker.

11. The computer program product of claim 9 wherein at least one of the first data processing engine and the second data processing engine is an application program interface.

12. The computer program product of claim 9 further comprising:
    more than two data processing engines.

* * * * *